May 14, 1935.　　B. A. SWENNES　　2,001,165
PROPELLER SHAFT
Filed June 7, 1932
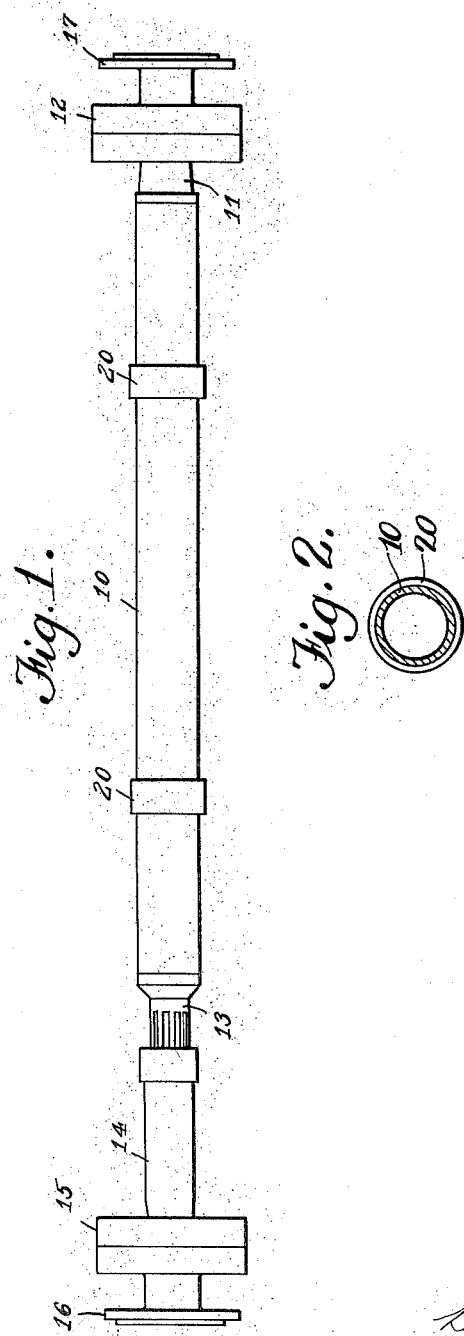
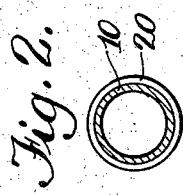
Inventor:
Benjamin A. Swennes Patented May 14, 1935

2,001,165

UNITED STATES PATENT OFFICE 2,001,165

PROPELLER SHAFT

Benjamin A. Swennes, Rockford, Ill., assignor, by mesne assignments, to Borg-Warner Corporation, Chicago, Ill., a corporation of Illinois Application June 7, 1932, Serial No. 615,917

7 Claims. (Cl. 64—29)

This invention relates to propeller shafts for motor vehicles.

In the construction of motor vehicles considerable attention has been given to the matter of absorbing vibration and deadening sound. Practically every part of the car has been studied with that object in view but, so far as I am aware, there has been no improvement made in the propeller shaft to overcome the objectionable noise due to the resonance of this tubular part which asserts itself at certain critical speeds, nor any improvement with a view to diminishing if not entirely eliminating its susceptibility to transmitting vibrations, created or occurring in either of the mechanisms ahead and behind the propeller shaft. It is, therefore, the principal object of my invention to provide a non-resonant and vibration dampening propeller shaft.

In the drawing, to which reference is made in the following detailed description, Figure 1 shows a propeller shaft provided with bands in accordance with my invention, and Fig. 2 is a cross-section through the shaft showing one of the bands in end elevation.

The same reference numerals are applied to corresponding parts in the two views.

The propeller shaft of my invention is tubular and is provided with bands frictionally mounted thereon at the proper points to dampen vibration and avoid the phenomena of resonance.

Referring to the drawing, the propeller shaft is indicated by the reference numeral 10. It is tubular like other propeller shafts and joined at its rear end to the yoke 11 of a universal joint 12 to transmit power to the driven spindle in the rear axle housing of the motor vehicle on which the propeller shaft is mounted. The front end of the shaft carries a splined part 13 received within the slip yoke 14 of the front universal joint 15 so as to make connection with the gear set. The connections at the front and rear may be completed through the conventional coupling flanges 16 and 17, or in any other suitable or preferred manner.

The propeller shaft 10 is subjected to torsional, column or strut, and beam deflections. Being of regular section it is also subject to natural harmonic resonance. This resonance may be the result of the direct forces, above mentioned, or due to sympathetic harmonic resonance. That is to say, the deflections of an ordinary tubular propeller shaft incident to operation of the motor vehicle are found to cause a distinct noise attributable to the resonance of the part. Then, too, sympathetic vibration of an ordinary tubular propeller shaft causes a distinct noise to be heard at certain critical speeds where such vibration manifests itself. The vibrations which the propeller shaft may fall in with in the way of sympathetic vibrations, may be created or occur either in the rear axle or in any part of the mechanism in front of the propeller shaft, and, of course, some vibrations occurring ahead or behind the propeller shaft may be transmitted directly through the propeller shaft unless the same is properly constructed to dampen out such vibration. An ordinary propeller shaft being of tubular section also has a harmonic vibration by reason of the closed air space.

I have found that by applying bands 20 frictionally to the tubular propeller shaft 10 at the proper points its vibration can be substantially completely dampened and the shaft becomes substantially non-resonant. The exact and proper location for these bands must, of course, be determined experimentally, but once the proper location is determined for a given sized shaft, there is, of course, no problem in producing the shafts in quantities, because the bands can all be placed alike. The bands are long enough so that assuming there is some slight variation in the characteristics of different shafts of the same size, the bands are bound to span the proper points on the shafts and thus give the desired result. Assuming a correct diagnosis of the effect secured by these bands, they are placed at the points of maximum vibratory motion, thus accounting for the dampening of vibration and the elimination of the phenomena of resonance. The bands may be of steel or other metal shrunk in position or otherwise frictionally fixed on the shaft, or may be of rubber relying upon its resilience to frictionally hug the shaft, or these bands may be of any other metallic or non-metallic material suitable for the purpose. Obviously, it is important that the bands be truly concentric with the shaft so that there will be no likelihood of throwing the shaft out of dynamic balance.

It is believed the foregoing description conveys a good understanding of all of the objects and advantages of my invention. The appended claims have been drawn to cover all legitimate modifications and adaptations.

I claim:

1. In a motor vehicle power transmission train, a hollow propeller shaft having suitable power transmitting connections at opposite ends, and means turning with the shaft as a rigid part thereof and having engagement with the walls of said shaft only at and in the vicinity of the points of maximum vibratory motion to dampen the vibration and render the shaft substantially non-resonant.

2. A propeller shaft comprising a tubular member and dampener bands snugly and frictionally encircling the same at the points of maximum vibratory motion.

3. A propeller shaft comprising a tubular member and vibration dampening means adapted to turn with the member but having frictional engagement with the walls thereof only at and in the immediate vicinity of points spaced lengthwise thereof where there is maximum vibratory motion to minimize resonance in the member.

4. A substantially non-resonant propeller shaft for motor vehicles comprising a tubular body, and vibration dampening members frictionally engaging the wall of said shaft at such predetermined points spaced lengthwise thereof that resonance in the body is reduced to a minimum, the said members turning with the tubular member in true concentric relation therewith so as not to disturb the dynamic balance thereof.

5. A substantially non-resonant propeller shaft for motor vehicles comprising a tubular body, and vibration dampening members frictionally engaging the walls of said shaft at such predetermined points spaced lengthwise thereof that resonance in the body is reduced to a minimum, the said members turning with the tubular member in true concentric relation therewith so as not to disturb the dynamic balance thereof, and said members being sufficiently elongated whereby to span the proper points on the tubular member when located by approximation.

6. A propeller shaft comprising a tubular member and a pair of spaced vibration dampening bands snugly and frictionally encircling the same at the two points of maximum vibratory motion.

7. A propeller shaft comprising a tubular member and a pair of spaced vibration dampening bands snugly and frictionally encircling the same at the two points of maximum vibratory motion, said bands being sufficiently elongated whereby to span the proper points on the tubular member when located by approximation.

BENJAMIN A. SWENNES.